United States Patent [19]

Oberthuer et al.

[11] 4,159,853
[45] Jul. 3, 1979

[54] PRESSURE CONTROL UNIT FOR A VEHICULAR HYDRAULIC BRAKING SYSTEM

[75] Inventors: Heinrich Oberthuer, Offenbachrumpenheim; Jochen Burgdorf, Offenbach; Hans-Henning Luepertz, Darmstadt, all of Fed. Rep. of Germany

[73] Assignee: ITT Industries, Incorporated, New York, N.Y.

[21] Appl. No.: 813,929

[22] Filed: Jul. 8, 1977

[30] Foreign Application Priority Data

Aug. 19, 1976 [DE] Fed. Rep. of Germany ....... 2637278

[51] Int. Cl.$^2$ ............................................. B60T 13/00
[52] U.S. Cl. ...................... 303/6 C; 137/87; 303/22 R
[58] Field of Search ............. 303/6 C, 22 R; 188/349, 188/195; 137/87, 100

[56] References Cited
U.S. PATENT DOCUMENTS
3,738,709  6/1973  Stokes ................................. 137/87

Primary Examiner—Trygve M. Blix
Assistant Examiner—Reinhard J. Eisenzopf
Attorney, Agent, or Firm—John T. O'Halloran; Alfred C. Hill

[57] ABSTRACT

There is disclosed a dual-circuit brake-force distributor wherein the control force of one circuit is transmitted to the other circuit through a floating intermediate piston. In order to achieve a highly sensitive control, the intermediate piston is provided with a large cross-sectional area. In the event of failure of the one circuit, the intermediate piston will become blocked and the control force will be transmitted through an auxiliary piston having a smaller cross-sectional area. By this arrangement upon failure of the one circuit a sufficient amount of braking pressure can still build up in the other intact braking circuit.

5 Claims, 1 Drawing Figure

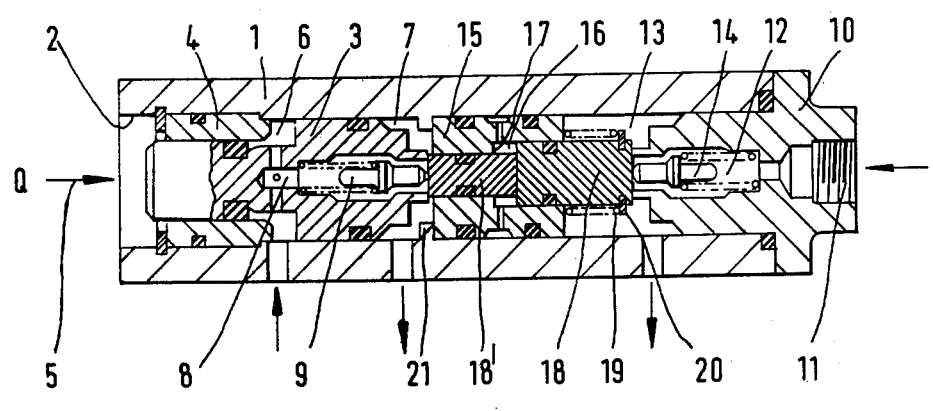

PRESSURE CONTROL UNIT FOR A VEHICULAR HYDRAULIC BRAKING SYSTEM

BACKGROUND OF THE INVENTION

This invention relates to a pressure-control unit for a vehicular hydraulic braking system including a pressure-reducing valve and a pressure-limiting valve arranged coaxially therewith, with an intermediate piston which is acted upon by the output pressure between the pressure-reducing valve and the pressure-limiting valve.

In a known pressure-control unit, if both brake circuits are intact, the intermediate piston causes the output pressure of the pressure-limiting valve to follow the output pressure of the pressure-reducing valve above the changeover point. This is achieved due to the fact that in the event of a differential pressure the intermediate piston becomes displaced and thereby influences the closure members of the two valves in such a way that the output pressures approximate each other, while their magnitude is determined by the pressure-reducing valve.

Because of the frictional resistance of the seals of the intermediate piston, a pressure differential is required for its displacement which differential is determined by the cross-sectional area of the intermediate piston and its frictional resistance. This pressure differential should be as small as possible in order to render the two output pressures as even as possible. This results in the requirement for the intermediate piston to have a diameter as large as possible because the ratio between the cross-sectional area and the frictional resistance becomes more favorable as the diameter increases, so that the intermediate piston becomes displaced at a small pressure differential, i.e., the hysteresis becomes smaller.

When dimensioning the intermediate piston, it is also necessary to consider the case that the brake circuit controlled by the pressure-reducing valve fails. In this instance, the output pressure of the pressure-limiting valve is only counteracted by the control force of the pressure-reducing valve, which results in a real limitation of the output pressure of the pressure-limiting valve. In this process, the magnitude of the limited output pressure is dependent on the magnitude of the control force and the cross-sectional area of the intermediate piston. Since the desired output pressure is as high as possible in this case, the cross-sectional area and thus the diameter of the intermediate piston must be as small as possible.

Hence, there are two directly contradicting requirements with respect of the dimensions of the intermediate piston; as a rule, the middle course is chosen. This middle course is, however, not fully satisfactory.

SUMMARY OF THE INVENTION

Therefore, it is the object of the present invention to improve the known pressure-control unit in such a manner that on the one hand, with the brake circuits intact, there is only a slight difference between the two output pressures and, on the other hand, in the event of failure of the brake circuit controlled by the pressure-reducing valve, the pressure-limiting valve yields a high output pressure before its closure member reaches its closed position.

A feature of the present invention is the provision of an improvement to a pressure-control unit for a vehicular hydraulic braking system including a housing having an axis incorporating at one end thereof a pressure-reducing valve coaxial of the axis and at the other end thereof a pressure-limiting valve coaxial of the axis, and an intermediate piston disposed between the pressure-reducing valve and the pressure limiting valve, the intermediate piston being acted thereon by output pressure at both ends thereof; the improvement comprising: a first stop formed in the housing to limit the displacement travel of the intermediate piston toward the pressure reducing valve, an axial bore disposed in the intermediate piston, an auxiliary piston disposed in the bore acted upon by the output pressure at both ends thereof, the auxiliary piston being supported at one end by the pressure-reducing valve and at the other end by the pressure-limiting valve, and a second stop formed in the intermediate piston to limit the displacement travel of the auxiliary piston in the intermediate piston in the direction of the pressure-reducing valve.

Thus, when dimensioning the intermediate piston, no allowance need be made for the case of failure of the brake circuit controlled by the pressure-reducing valve. Therefore, its diameter may be sufficiently large to achieve a very small hysteresis. In the event of failure of this brake circuit, the output pressure of the pressure-limiting valve, in addition to being determined by the control force, will only be determined by the cross-sectional area of the equally freely dimensionable auxiliary piston, which area faces the pressure-limiting valve, because in that case the intermediate piston bears directly against the housing and not against the control force. The stop at the intermediate piston prevents the force transmittable from the intermediate piston to the auxiliary piston for pushing the valve member towards the open pressure-limiting valve is limited by the frictional resistance between the auxiliary piston and the intermediate piston. As long as the intermediate piston and the auxiliary piston are acted upon by purely hydraulic means, they will always move jointly because, as set forth initially, a large piston will require a smaller pressure differential for movement than a small piston.

An advantageous improvement is to design the bore in the intermediate piston as a stepped bore and to design the auxiliary piston as a stepped piston the larger end of which is acted upon by the output pressure of the pressure-limiting valve while its smaller end is acted upon by the output pressure of the pressure-reducing valve, and to use the step of the stepped bore as the stop for the intermediate piston. It is achieved by this arrangement that during normal operation and with the brake circuits intact, the intermediate piston assumes a precisely defined position relative to the auxiliary piston and reaches the position determined by the stop at the intermediate piston only after the control action has already started.

Owing to the fact that a return spring bears against the auxiliary piston in the direction of the pressure-limiting valve and against the intermediate piston in the direction of the pressure-reducing valve, it is achieved that the intermediate piston is maintained in its inactive position at the stop formed in the housing. Only at the time of pressure build-up commencing will the intermediate piston be displaced against the step of the housing. Thus, during normal function, all parts are moved so that sticking of seals due to prolonged non-actuation will be prevented. If pressure does not build up in the brake circuit controlled by the pressure-reducing valve, the intermediate piston need not first be shifted towards the stop formed in the housing which would result in fluid volume being drawn from the intact brake circuit.

In another improvement which is particularly favorable with respect to the manufacture of the components, the stepped piston includes two pistons of different diameters which bear against each other mechanically. This arrangement avoids the necessity for the two piston sliding surfaces in the stepped bore and at the auxiliary piston to be exactly concentric which is of great importance where small diameters are used.

BRIEF DESCRIPTION OF THE DRAWING

Above-mentioned and other features and objects of this invention will become more apparent by reference to the following description taken in conjunction with the accompanying drawing, in which, the single FIGURE is a longitudinal cross-sectional view of a pressure-control unit in accordance with the principles of the present invention.

DESCRIPTION OF THE PREFERRED EMBODIMENT

There is provided in a housing 1 a bore 2 accommodating a stepped piston 3 with the smaller diameter end extending to the left when viewing the drawing. The smaller-diameter end extends out of bore 2 through a sleeve 4. A control force Q which is indicated by an arrow 5 and may be responsive to the axle load, for example, acts on said smaller-diameter end of piston 3. The stepped piston 3 is slidably sealed and guided in the bore 2 and the sleeve 4, thereby defining at the step of piston 3 an annular chamber 6. Annular chamber 6 communicates with a braking-pressure source of a first brake circuit through a pressure-fluid port. The larger front end of the stepped piston 3 defines the one side of an outlet chamber 7 which communicates with the wheel brakes of first brake circuit through a pressure-fluid port. Provided in stepped piston 3 is a fluid passage 8 which connects annular chamber 6 to outlet chamber 7 and is adapted to be closed by a spring-loaded closure member 9.

On the right when viewing the drawing, bore 2 is closed off by an element 10 secured to the housing 1, which element includes a fluid port 11 communicating, through a fluid passage 12, with an outlet chamber 13 defined on the one side by element 10. A spring-loaded closure member 14 is arranged in the fluid passage 12. The outlet chamber 13 communicates with wheel brakes of second brake circuit, while the fluid port 11 communicates with a braking-pressure source for a second brake circuit.

Arranged between outlet chamber 7 and outlet chamber 13 is an intermediate piston 15 which is slidably sealed in bore 2 and provides for fluid-tight sealing off of the outlet chamber 7 relative to outlet chamber 13. The structure of the pressure-control unit so far described corresponds fully to the structure of a known pressure-control unit.

The improvement of the known pressure-control unit includes the intermediate piston 15 provided with an axial bore 16 which is of stepped design and includes a step forming a stop 17. In the area of the step, the bore 16 connects with atmosphere through a breather bore in a known manner. Bore 16 accommodates slidably sealed therein an auxiliary piston 18 comprising two pistons 18, 18' bearing against each other, thus forming a stepped piston the larger end of which faces outlet chamber 13 while its smaller end faces outlet chamber 7.

The two ends of auxiliary piston 18 extend beyond intermediate piston 15. About the end of auxiliary piston 18 projecting into outlet chamber 13 there is arranged a return spring 19 supported at one by one end of intermediate piston 15 and with the other end supported by a circlip 20 fixed to the end of auxiliary piston 18.

Control force Q acts upon stepped piston 3 to the right when viewing the drawing. Piston 3 bears against auxiliary piston 18' and as a result closure member 9 is kept in the open position. Auxiliary piston 18 in turn bears against element 10 and closure member 14, thereby also keeping closure member 14 in the open position. Due to the action of return spring 19, intermediate piston 15 is urged to the left and is supported by a stop 21 formed in the housing 1 in outlet chamber 7.

If both brake circuits are intact so that pressure fluid is fed to annular chamber 6 and fluid port 11, there results the following function. As pressure commences to build up, the pressure fluid is first fed from annular chamber 6 to outlet chamber 7 and from fluid port 11 to outlet chamber 13. Thus, an output pressure prevails in outlet chambers 7 and 13 which corresponds to the pressure of the braking-pressure source. These output pressures act on intermediate piston 15 whose end facing outlet chamber 13 is smaller than its end facing outlet chamber 7 due to its stepped axial bore 16. As a result intermediate piston 15 becomes displaced to the right in opposition to the return spring 19 until intermediate piston stop 17 rests against auxiliary piston 18. In this process, intermediate piston 15 has moved away from the stop 21 formed in the housing. Auxiliary piston 18 remains for the time being held in a position between stepped piston 3 and element 10 due to the action of control force Q.

As the pressure increases in annular chamber 6 and outlet chamber 7, a force acting in a known manner upon stepped piston 3 in opposition to control force Q increases equally. As soon as this force overcomes the control force, the changeover point has been reached, i.e., the stepped piston 3 is moved to the left, closure member 9 reaches its closing position, and the pressurization of outlet chamber 7 is diminished compared to annular chamber 6. From that moment on, the forces acting on auxiliary piston 18 in outlet chamber 7 are purely hydraulic. Therefore, as the pressure in outlet chamber 13 increases, the piston 18 moves to the left together with intermediate piston 15, thereby causing closure member 14 to reach its closing position. Because of their different end areas, auxiliary piston 18 and intermediate piston 15 are always held in mutual abutment against stop 17 hydraulically, thus forming during normal operation a unit whose total surface facing outlet chamber 7 corresponds to the total surface facing outlet chamber 13. By these means, intermediate piston 15 always provides, in co-operation with auxiliary piston 18, for the same amount of pressure in the two outlet chambers 7 and 13. Following termination of braking, i.e., when the pressure of the braking-pressure source returns to zero, all parts reassume their illustrated positions. Due to control force Q, auxiliary piston 18 is again held in position mechanically between stepped piston 3 and element 10. Intermediate piston 15 is again shifted against the stop 21 formed in the housing 1 by means of return spring 19.

In the event of failure of the brake circuit controlled by the pressure-reducing valve 3, 8, 9, there results the following action. In that case, annular chamber 6 and outlet chamber 7 are unpressurized so that neither intermediate piston 15 nor auxiliary piston 18 are acted upon to the right hydraulically. Only auxiliary piston 18 is acted upon mechanically by control force Q through stepped piston 3. Outlet chamber 13 is pressurized by the pressure supplied by the braking-pressure source of the second intact brake circuit. This pressure acts upon the front end of intermediate piston 15 and auxiliary piston 18 facing outlet chamber 13. As a result, intermediate piston 15 is increasingly urged against the stop 21 formed in the housing 1 and remains in its position. Auxiliary piston 18 is urged against the control force and shifted to the left at a pressure which is determined by the control force Q and the end facing outlet chamber 13. Closure member 14 thereby reaches its closing position so that outlet chamber 13 cannot be pressurized further. Consequently, the cut-off pressure of the pressure-limiting valve 10, 12, 14 is only determined by the end of auxiliary piston 18 facing outlet chamber 13 and not by the front end of intermediate piston 15. The end of intermediate piston 15 including that of auxiliary piston 18 is of determining influence for the pressure balance between the two outlet chambers 7 and 13 only if the braking system is intact.

In the event of failure of the brake circuit incorporating the pressure-limiting valve 10, 12, 14, the pressure-reducing valve 3, 8, 9 operates completely normally. Only the intermediate piston 15 is displaced with its stop 17 to the right against auxiliary piston 18 by the pressure in outlet chamber 7, and bears against the auxiliary piston 18 mechanically. Auxiliary piston 18 in turn continues to bear mechanically against element 10 because in that case pressure does not build up in outlet chamber 13.

While we have described above the principles of our invention in connection with specific apparatus it is to be clearly understood that this description is made only by way of example and not as a limitation to the scope of our invention as set forth in the objects thereof and in the accompanying claims.

We claim:

1. An improvement to a pressure-control unit for a vehicular hydraulic braking system including a housing having an axis incorporating at one end thereof a pressure-reducing valve coaxial of said axis and at the other end thereof a pressure-limiting valve coaxial of said axis, and an intermediate piston disposed between said pressure-reducing valve and said pressure limiting valve, said intermediate piston being acted thereon by output pressure at both ends thereof; said improvement comprising:
   a first stop formed in said housing to limit the displacement travel of said intermediate piston toward said pressure reducing valve,
   an axial bore disposed in said intermediate piston,
   an auxiliary piston disposed in said bore acted upon by said output pressure at both ends thereof, said auxiliary piston being supported at one end by said pressure-reducing valve and at the other end by said pressure-limiting valve, and
   a second stop formed in said intermediate piston to limit the displacement travel of said auxiliary piston in said intermediate piston in the direction of said pressure-reducing valve.

2. An improvement according to claim 1, wherein said bore is a stepped bore,
   said intermediate piston is a stepped piston having the larger end thereof acted upon by the output pressure of said pressure-limiting valve and the smaller end thereof acted upon by the output pressure of said pressure-reducing valve, and
   the step of said stepped bore is said second stop.

3. An improvement according to claim 2, wherein said stepped auxiliary piston includes
   two pistons each having a different diameter which mechanically bear against each other.

4. An improvement according to claim 2, further including
   a return spring bearing against said auxiliary piston in the direction of said pressure-limiting valve and against said intermediate piston in the direction of said pressure-reducing valve.

5. An improvement according to claim 4, wherein said stepped auxiliary piston includes
   two pistons each having a different diameter which mechanically bear against each other.

* * * * *